(12) United States Patent
Cheeley et al.

(10) Patent No.: US 9,938,594 B2
(45) Date of Patent: Apr. 10, 2018

(54) METHODS AND SYSTEMS FOR PRODUCING DIRECT REDUCED IRON AND STEEL MILL FUEL GAS USING COKE OVEN GAS AND BASIC OXYGEN FURNACE GAS

(71) Applicants: Robert Cheeley, Charlotte, NC (US); Travis Wright, Rock Hill, SC (US)

(72) Inventors: Robert Cheeley, Charlotte, NC (US); Travis Wright, Rock Hill, SC (US)

(73) Assignee: Midrex Technologies, Inc., Charlotte, NC (US)

( * ) Notice: Subject to any disclaimer, the term of this patent is extended or adjusted under 35 U.S.C. 154(b) by 215 days.

(21) Appl. No.: 14/799,850

(22) Filed: Jul. 15, 2015

(65) Prior Publication Data
US 2016/0017445 A1    Jan. 21, 2016

Related U.S. Application Data

(60) Provisional application No. 62/024,767, filed on Jul. 15, 2014.

(51) Int. Cl.
*C21B 13/00* (2006.01)
*C21B 13/02* (2006.01)
(Continued)

(52) U.S. Cl.
CPC ............ *C21B 13/0073* (2013.01); *C01B 3/02* (2013.01); *C01B 3/50* (2013.01); *C01B 3/56* (2013.01);
(Continued)

(58) Field of Classification Search
CPC ....... C21B 13/0073; C21B 13/02; C01B 3/50; C01B 3/56; C01B 2203/43;
(Continued)

(56) References Cited

U.S. PATENT DOCUMENTS 2,873,183 A * 2/1959 Pike ........................ C21B 13/06
266/156
6,146,442 A * 11/2000 Sanford .................. C21B 13/02
266/197

(Continued)

FOREIGN PATENT DOCUMENTS

JP            5891003 A      5/1983
JP            58190801 A    11/1983

OTHER PUBLICATIONS

Nishida et al. JP 58190801 A published Nov. 1983. Machine translation.*

(Continued)

*Primary Examiner* — George Wyszomierski
*Assistant Examiner* — Tina M McGuthry Banks
(74) *Attorney, Agent, or Firm* — Clements Bernard Walker PLLC; Christopher L. Bernard

(57) ABSTRACT

A process for producing reducing gas for use in the production of direct reduced iron (DRI) and fuel gas for use in a steel mill, including: compressing a coke oven gas (COG) stream in a compressor; passing the compressed coke oven gas stream through an activated charcoal bed to remove tars from the compressed coke oven gas stream; separating a hydrogen-rich gas stream from the compressed cleaned coke oven gas stream using a pressure swing absorption unit; providing the hydrogen-rich gas stream to a direct reduction shaft furnace as reducing gas; and providing a remaining gas stream from the pressure swing absorption unit to a steel mill as fuel gas. Both once-through and recycle options are presented. Optionally, basic oxygen furnace gas (BOFG) is added to the reducing gas.

8 Claims, 4 Drawing Sheets

(51) Int. Cl.
  *C01B 3/02* (2006.01)
  *C01B 3/50* (2006.01)
  *C01B 3/56* (2006.01)

(52) U.S. Cl.
  CPC ........ *C21B 13/02* (2013.01); *C01B 2203/043* (2013.01); *C01B 2203/048* (2013.01); *C01B 2203/0485* (2013.01); *C01B 2203/06* (2013.01); *Y02P 10/122* (2015.11); *Y02P 10/126* (2015.11); *Y02P 10/128* (2015.11); *Y02P 10/136* (2015.11); *Y02P 10/212* (2015.11)

(58) Field of Classification Search
  CPC ............ C01B 2203/48; C01B 2203/85; C01B 2203/06; C01B 3/02
  See application file for complete search history.

(56) References Cited

U.S. PATENT DOCUMENTS

| 6,478,841 | B1 | 11/2002 | Faccone et al. |
| 8,617,423 | B2 * | 12/2013 | Menzel ................ C01B 3/02 252/373 |
| 2006/0027043 | A1 | 2/2006 | Zendejas-Martinez |
| 2013/0312571 | A1 | 11/2013 | Metius et al. |

OTHER PUBLICATIONS

Oct. 13, 2015 International Search Report issued in International Application No. PCT/US2015/40516.

\* cited by examiner

METHODS AND SYSTEMS FOR PRODUCING DIRECT REDUCED IRON AND STEEL MILL FUEL GAS USING COKE OVEN GAS AND BASIC OXYGEN FURNACE GAS

CROSS-REFERENCE TO RELATED APPLICATION

The present patent application/patent claims the benefit of priority of U.S. Provisional Patent Application No. 62/024,767, filed on Jul. 15, 2014, and entitled "METHODS AND SYSTEMS FOR PRODUCING DIRECT REDUCED IRON AND STEEL MILL FUEL GAS USING COKE OVEN GAS AND BASIC OXYGEN FURNACE GAS," the contents of which are incorporated in full by reference herein.

FIELD OF THE INVENTION

The present invention relates generally to methods and systems for producing direct reduced iron (DRI). More specifically, the present invention relates to methods and systems for producing DRI and steel mill fuel gas using coke oven gas (COG) and basic oxygen furnace gas (BOFG).

BACKGROUND OF THE INVENTION

In various applications, it is desirable to use COG as both a reducing gas for producing DRI and as steel mill fuel gas. Conventionally, however, this presented problems due to the high level of hydrocarbons present in the COG, DRI sulfur issues, and the requirement for CO2 removal from the recycle gas.

Thus, in various exemplary embodiments, the present invention provides for the use of COG as both a both a reducing gas for producing DRI and as steel mill fuel gas. The COG is first compressed, then passed through an activated charcoal bed to remove the tars. Then, the COG is passed through a pressure swing absorption (PSA) unit or the like to create a high-purity H2 stream (about 99% purity) to be used as reducing gas in the direct reduction shaft furnace. The high purity H2 stream represents approximately 75% of the H2 in the COG and approximately 40% of the total COG stream. The remainder of the COG (including all of the sulfur and almost all of the hydrocarbons), about 60% of the COG total, is directed to a steel mill as fuel gas. As a result of using high purity H2 as reducing gas, the endothermic (heat consuming) hydrocarbon cracking and reforming reactions in the direct reduction shaft furnace are avoided, DRI sulfur issues are not present, and there is no requirement for CO2 removal from the recycle gas, with water advantageously being the primary by-product of the direct reduction reactions. Both once-through and recycle options are presented. Optionally, BOFG can be added to the reducing gas stream.

BRIEF SUMMARY OF THE INVENTION

In various exemplary embodiments, the present invention provides a process for producing reducing gas for use in the production of direct reduced iron and fuel gas for use in a steel mill, comprising: compressing a COG stream in a compressor; passing the compressed COG stream through an activated charcoal bed to remove tars from the compressed COG stream; separating a hydrogen-rich gas stream from the compressed cleaned COG stream using a PSA unit or the like; providing the hydrogen-rich gas stream to a direct reduction shaft furnace as reducing gas, optionally first adding a BOFG stream; and providing a remaining gas stream from the PSA unit or the like to a steel mill as fuel gas. The COG stream is compressed to about 5-10 BARG. The hydrogen-rich gas stream contains about 99% hydrogen. The hydrogen-rich gas stream contains about 75% of the hydrogen in the COG stream. The H2 rich gas stream contains about 40% of the COG. Both once-through and recycle options are presented.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Again, in various exemplary embodiments, the present invention provides for the use of COG as both a both a reducing gas for producing DRI and as steel mill fuel gas. The COG is first compressed, then passed through an activated charcoal bed to remove the tars. Then, the COG is passed through a pressure swing absorption (PSA) unit or the like to create a high-purity H2 stream (about 99% purity) to be used as reducing gas in the direct reduction shaft furnace. The high purity H2 stream represents approximately 75% of the H2 in the COG and approximately 40% of the total COG stream. The remainder of the COG (including all sulfur and almost all of the hydrocarbons) about 60% of the total COG, is directed to a steel mill as fuel gas. As a result of using high purity H2 as reducing gas, the endothermic (heat consuming) hydrocarbon cracking and reforming reactions in the direct reduction shaft furnace are avoided, DRI sulfur issues are not present, and there is no requirement for CO2 removal from the recycle gas, with water advantageously being the primary by-product of the iron oxide reduction reactions. Both once-through and recycle options are presented. Optionally, BOFG can be added to the reducing gas stream.

Figure 1:
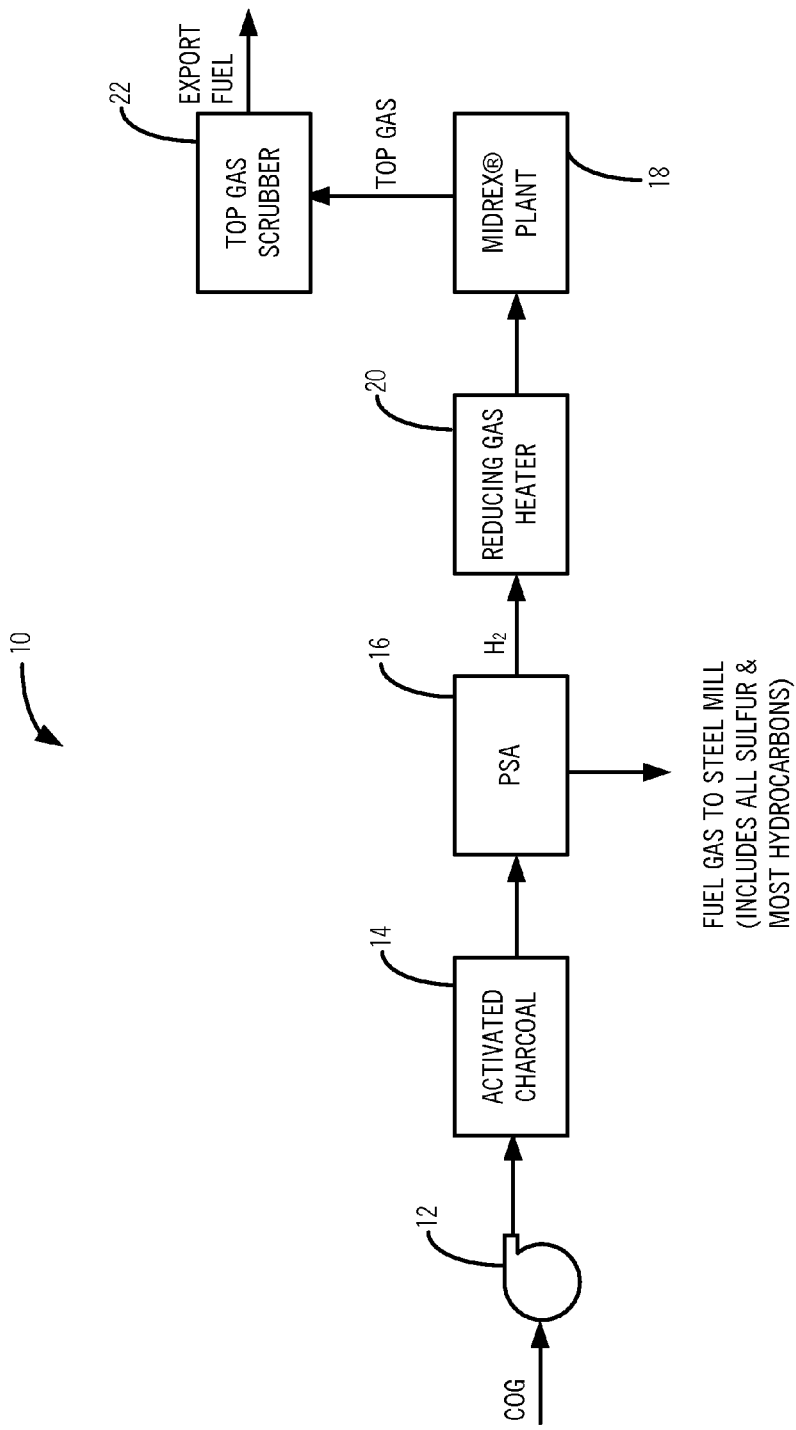
FIG. 1 is a flowsheet illustrating one exemplary once-through embodiment of a method and system for producing DRI and steel mill fuel gas using COG, in accordance with the present invention.

Referring now specifically to FIG. 1, in one exemplary once-through embodiment of the process 10, the COG stream is first compressed to about 5-10 BARG in a compressor 12. The compressed COG stream is then passed through an activated charcoal bed 14 to remove the tars. Then, the compressed cleaned COG stream is passed through a PSA unit 16 or the like to create a high-purity H2 stream (about 99% purity) to be used as reducing gas in the direct reduction shaft furnace 18. The high purity H2 stream represents approximately 75% of the H2 in the COG and approximately 40% of the total COG flow. The remainder of the COG (including all of the sulfur and almost all of the hydrocarbons), about 60% of the COG total, is directed to a steel mill as fuel gas. The reducing gas is pre-heated to about 950 degrees C. in the reducing gas heater 20 before being introduced into the direct reduction shaft furnace 18. The top gas from the direct reduction shaft furnace 18 is cooled and cleaned in a top gas scrubber 22 before being exported to the steel mill for use as a fuel gas.

Because the reducing gas contains almost no hydrocarbons, the endothermic (i.e. heat consuming) hydrocarbon cracking and reforming reactions are avoided in the direct reduction shaft furnace 18, thus preventing unwanted cooling and efficiency reduction. Because the reducing gas contains no sulfur, the DRI contains no sulfur, reducing steel mill capital and operating costs and increasing steel mill efficiency. Because the reducing gas contains almost no hydrocarbons or CO, the DRI contains about 0% carbon.

Figure 2:
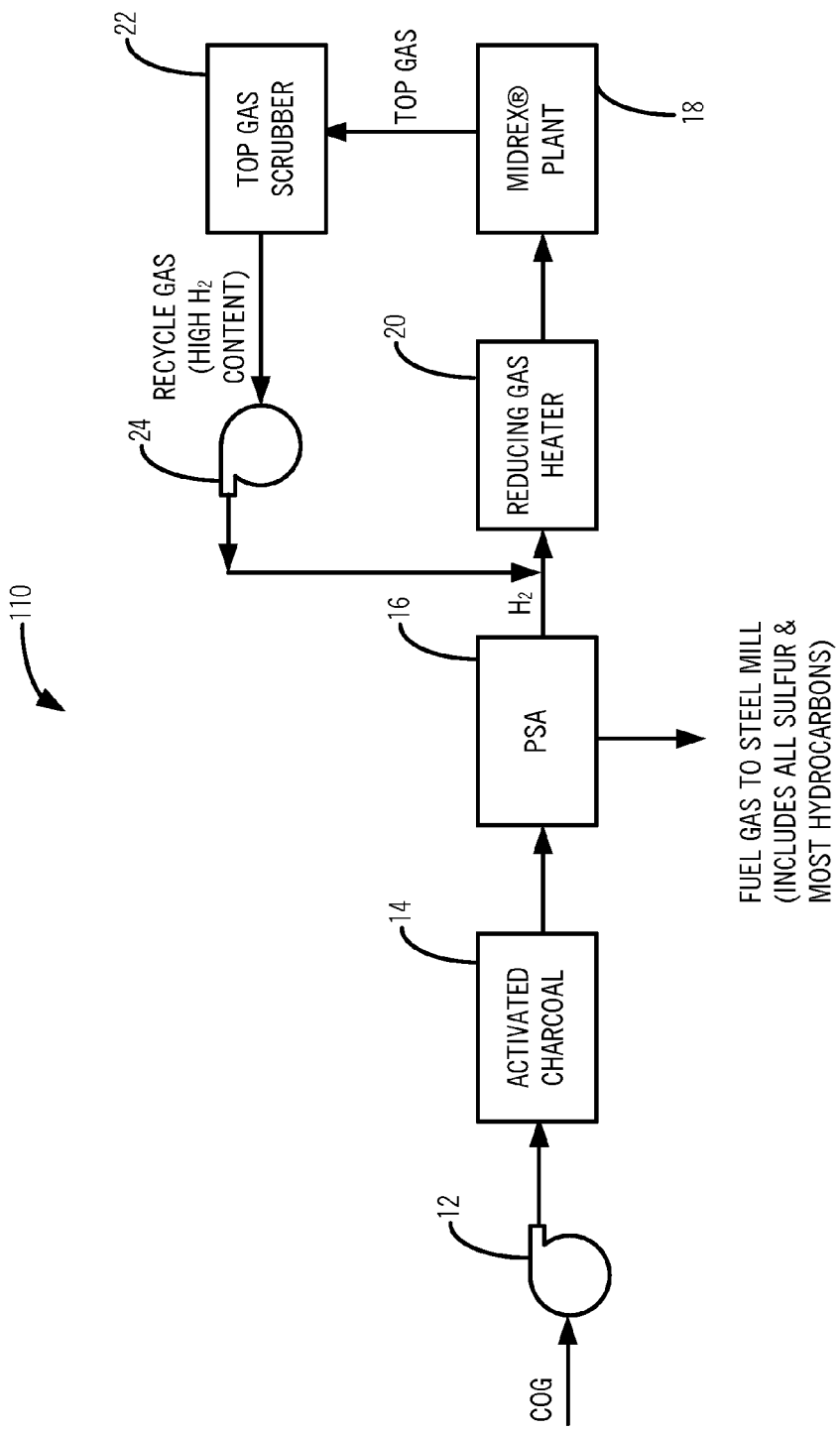
FIG. 2 is a flowsheet illustrating one exemplary recycle embodiment of a method and system for producing DRI and steel mill fuel gas using COG, in accordance with the present invention.

Referring now specifically to FIG. 2, in one exemplary recycle embodiment of the process 110, the COG stream is first compressed to about 5-10 BARG in a compressor 12. The compressed COG stream is then passed through an activated charcoal bed 14 to remove the tars. Then, the compressed cleaned COG stream is passed through a PSA unit 16 or the like to create a high-purity H2 stream (about 99% purity) to be used as reducing gas for use in the direct reduction shaft furnace 18. The high purity H2 stream represents approximately 75% of the H2 in the COG and approximately 40% of the total COG flow. The remainder of the COG (including all of the sulfur and almost all of the hydrocarbons), about 60% of the COG total, is directed to a steel mill as fuel gas. The reducing gas is pre-heated to about 950 degrees C. in the reducing gas heater 20 before being introduced into the DR shaft furnace 18. The top gas from the direct reduction shaft furnace contains >95% H2+H2O and is compressed to about 5 BARG in a compressor 24 before being recycled back to the reducing gas stream following the PSA unit 16.

Because the reducing gas contains almost no hydrocarbons, the endothermic (i.e. heat consuming) hydrocarbon cracking and reforming reactions are avoided in the direct reduction shaft furnace 18, thus preventing unwanted cooling and efficiency reduction. Because the reducing gas contains no sulfur, the DRI contains no sulfur, reducing steel mill capital and operating costs and increasing steel mill efficiency. Because the reducing gas contains almost no hydrocarbons or CO, the DRI contains about 0% carbon. Because the recycle gas contains >95% H2+H2O, a CO2 removal system is not required for the recycle gas stream.

Figure 3:
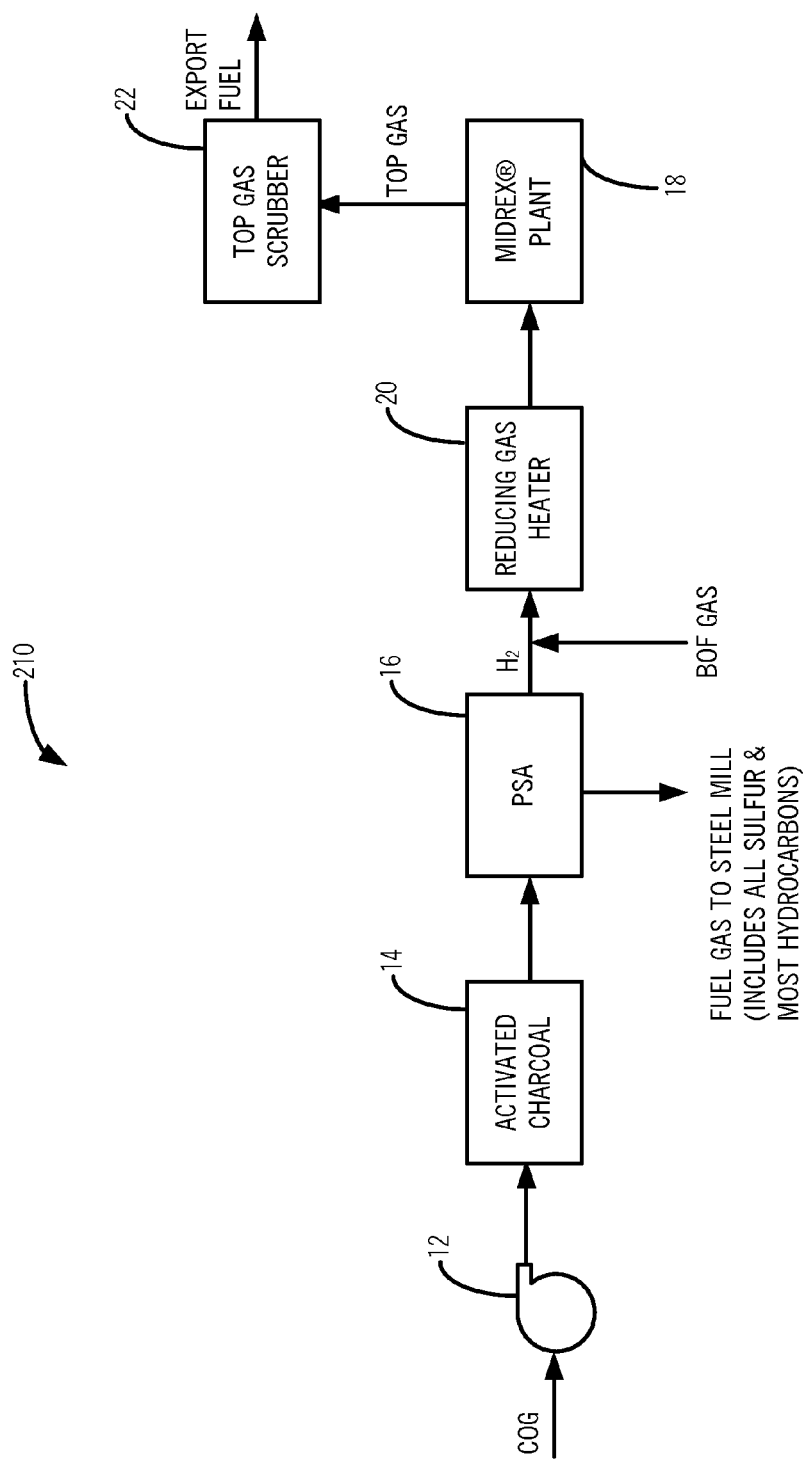
FIG. 3 is a flowsheet illustrating one exemplary once-through embodiment of a method and system for producing DRI and steel mill fuel gas using COG and BOFG, in accordance with the present invention.

Referring now specifically to FIG. 3, in one exemplary once-through embodiment of the process 210, the COG stream is first compressed to about 5-10 BARG in a compressor 12. The compressed COG stream is then passed through an activated charcoal bed 14 to remove the tars. Then, the compressed cleaned COG stream is passed through a PSA unit 16 or the like to create a high-purity H2 stream (about 99% purity) to be used as reducing gas in the direct reduction shaft furnace 18. The high purity H2 stream represents approximately 75% of the H2 in the COG and approximately 40% of the total COG flow. The remainder of the COG (including all of the sulfur and almost all of the hydrocarbons), about 60% of the COG total, is directed to a steel mill as fuel gas. BOFG containing about 70% CO is then added to the reducing gas stream. The H2/CO ratio in the reducing gas is dependent upon how much BOFG is added. The reducing gas is pre-heated to about 950 degrees C. in the reducing gas heater 20 before being introduced into the direct reduction shaft furnace 18. The top gas from the direct reduction shaft furnace 18 is cooled and cleaned in a top gas scrubber 22 before being exported to the steel mill for use as a fuel gas.

Because the reducing gas contains almost no hydrocarbons, the endothermic (i.e. heat consuming) hydrocarbon cracking and reforming reactions are avoided in the direct reduction shaft furnace 18, thus preventing unwanted cooling and efficiency reduction. Because the reducing gas contains no sulfur, the DRI contains no sulfur, reducing steel mill capital and operating costs and increasing steel mill efficiency. The DRI carbon content is strongly affected by the % of BOFG in the reducing gas.

Figure 4:
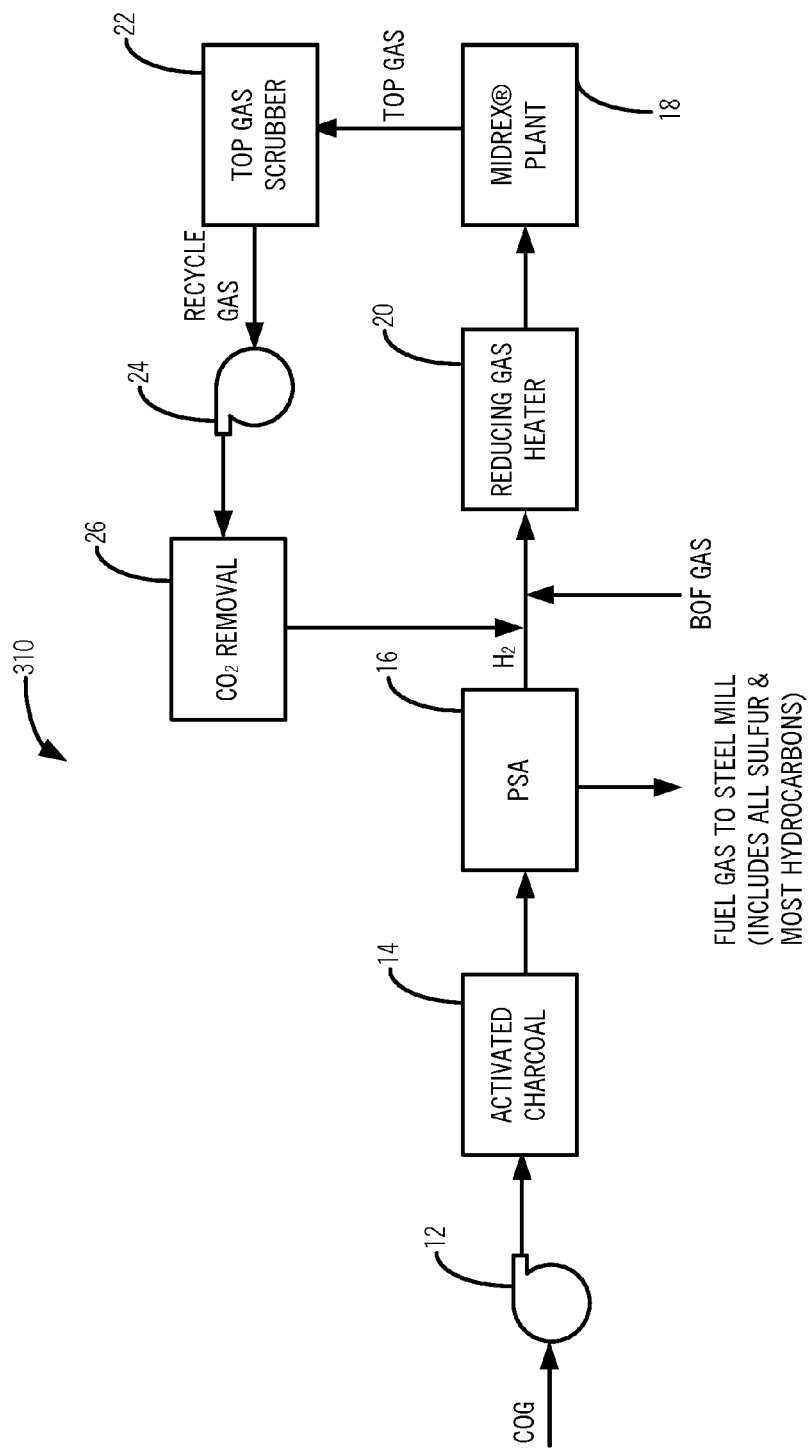
FIG. 4 is a flowsheet illustrating one exemplary recycle embodiment of a method and system for producing DRI and steel mill fuel gas using COG and BOFG, in accordance with the present invention.

Referring now specifically to FIG. 4, in one exemplary recycle embodiment of the process 310, the COG stream is first compressed to about 5-10 BARG in a compressor 12. The compressed COG stream is then passed through an activated charcoal bed 14 to remove the tars. Then, the compressed cleaned COG stream is passed through a PSA unit 16 or the like to create a high-purity H2 stream (about 99% purity) to be used as reducing gas in the direct reduction shaft furnace 18. The high purity H2 stream represents approximately 75% of the H2 in the COG and approximately 40% of the total COG flow. The remainder of the COG (including all of the sulfur and almost all of the hydrocarbons), about 60% of the COG total, is directed to a steel mill as fuel gas. BOFG containing about 70% CO is then added to the reducing gas stream. The H2/CO ratio in the reducing gas is dependent upon how much BOFG is added. The reducing gas is pre-heated to about 950 degrees C. in the reducing gas heater 20 before being introduced into the direct reduction shaft furnace 18. The top gas from the direct reduction shaft furnace 18 is cooled and cleaned in a top gas scrubber 22 and the recycle gas is passed through a CO2 removal system 26 before being recycled back to the reducing gas stream following the PSA unit 16.

Because the reducing gas contains almost no hydrocarbons, the endothermic (i.e. heat consuming) hydrocarbon cracking and reforming reactions are avoided in the direct reduction shaft furnace 18, thus preventing unwanted cooling and efficiency reduction. Because the reducing gas contains no sulfur, the DRI contains no sulfur, reducing steel mill capital and operating costs and increasing steel mill efficiency. The DRI carbon content is strongly affected by the % of BOFG in the reducing gas.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A process for producing reducing gas for use in the production of direct reduced iron (DRI) and fuel gas for use in a steel mill, comprising:

compressing a coke oven gas (COG) stream in a compressor;

passing the compressed COG stream through an activated charcoal bed to remove tars from the compressed COG stream to form a compressed cleaned COG stream;

separating a hydrogen-rich gas stream from the compressed cleaned COG stream using a pressure swing absorption (PSA) unit;

adding a basic oxygen furnace gas (BOFG) stream to the hydrogen-rich gas stream;

providing the hydrogen-rich gas stream to a direct reduction shaft furnace as reducing gas; and providing a remaining gas stream from the PSA unit to a steel mill as fuel gas.

2. The process of claim 1, wherein the coke oven gas stream is compressed to about 5-10 BARG.

3. The process of claim 1, wherein the hydrogen-rich gas stream comprises about 99% hydrogen.

4. The process of claim 1, wherein the hydrogen-rich gas stream comprises about 75% of the hydrogen from the coke oven gas stream.

5. The process of claim 1, wherein about 40% of the coke oven gas stream is used to generate reducing gas.

6. The process of claim 1, further comprising recycling a top gas stream from the direct reduction shaft furnace back to the reducing gas.

7. The process of claim 6, further comprising cooling and cleaning the top gas stream.

8. The process of claim 6, further comprising removing carbon dioxide from the top gas stream.

* * * * *